(12) United States Patent
Ishii

(10) Patent No.: US 9,432,603 B2
(45) Date of Patent: Aug. 30, 2016

(54) IMAGING APPARATUS

(71) Applicant: CANON KABUSHIKI KAISHA, Tokyo (JP)

(72) Inventor: Mie Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 13/687,298

(22) Filed: Nov. 28, 2012

(65) Prior Publication Data

US 2013/0141621 A1   Jun. 6, 2013

(30) Foreign Application Priority Data

Dec. 2, 2011   (JP) .................................. 2011-265073

(51) Int. Cl.
*H04N 5/374* (2011.01)
*H04N 5/361* (2011.01)

(52) U.S. Cl.
CPC .............. *H04N 5/374* (2013.01); *H04N 5/361* (2013.01)

(58) Field of Classification Search
CPC .. H04N 5/3456; H04N 9/3182; H04N 5/361; H04N 5/3452; H04N 3/155
USPC ................................................ 348/308, 241
See application file for complete search history.

(56) References Cited

U.S. PATENT DOCUMENTS

| | | | | |
|---|---|---|---|---|
| 6,700,608 B1* | 3/2004 | Fukuda | ......................... | 348/243 |
| 7,679,661 B2* | 3/2010 | Kondo | ......................... | 348/294 |
| 8,072,519 B2* | 12/2011 | Noda et al. | .................... | 348/294 |
| 8,659,691 B2* | 2/2014 | Noda et al. | .................... | 348/294 |
| 2002/0196260 A1* | 12/2002 | Candler | .................... | G06T 1/60 |
| | | | | 345/531 |
| 2003/0063511 A1* | 4/2003 | Hsu | ......................... | G11C 7/12 |
| | | | | 365/204 |
| 2005/0068436 A1* | 3/2005 | Fraenkel | .............. | H04N 5/2178 |
| | | | | 348/294 |
| 2005/0200509 A1* | 9/2005 | Sekiguchi | ........... | H03M 1/0607 |
| | | | | 341/144 |
| 2005/0281109 A1* | 12/2005 | Martelloni | ............ | G11C 11/412 |
| | | | | 365/206 |
| 2006/0007504 A1* | 1/2006 | Inaba | ................... | H04N 5/3658 |
| | | | | 358/463 |
| 2008/0180555 A1* | 7/2008 | Sato et al. | .................... | 348/248 |
| 2009/0109312 A1* | 4/2009 | Noda et al. | .................... | 348/304 |
| 2010/0085448 A1* | 4/2010 | Fukuoka | ....................... | 348/241 |
| 2010/0134667 A1* | 6/2010 | Suzuki et al. | ................ | 348/294 |
| 2015/0188632 A1* | 7/2015 | Aoyama | .............. | H04B 10/116 |
| | | | | 398/118 |

FOREIGN PATENT DOCUMENTS

| | | |
|---|---|---|
| CN | 101483712 A | 7/2009 |
| JP | 2008-041776 A | 2/2008 |
| JP | 2009-017517 A | 1/2009 |
| WO | 2010/131533 A1 | 11/2010 |

* cited by examiner

*Primary Examiner* — Roberto Velez
*Assistant Examiner* — Cynthia Segura
(74) *Attorney, Agent, or Firm* — Canon U.S.A., Inc. IP Division

(57) ABSTRACT

An imaging apparatus, which includes an imaging device having a plurality of image sensors, is configured to receive light incident on the imaging device, obtain an output voltage based the received light, and generate an image based on the output voltage. The plurality of image sensors have an aperture pixel region that accumulates and outputs the charges generated based on the incident light and a shielded optical black region. The imaging device performs a skipping operation for arbitrarily and non-sequentially selecting a read row. By performing an offset correction of a step amount produced during the non-sequential reading due to the skip operation, the step resulting from the skip reading can be corrected.

30 Claims, 14 Drawing Sheets

FIG. 7A SKIP READ OPERATION DIAGRAM

FIG. 7B EXPANDED OPERATION DIAGRAM

FIG. 10

| Y | OB OUTPUT BEFORE CLAMPING | OB OUTPUT AFTER CLAMPING | CLAMP AMOUNT |
|---|---|---|---|
| VOB FINAL ROW (Y=S0) | 200 | 500 | 300 |
| APERTURE PORTION FIRST ROW | 200 | | |
| APERTURE PORTION SECOND ROW | 210 | | |
| ... | ... | ... | ... |
| S1 (SKIP ROW) | 450 | 750.0 | 237.5 |
| S1+1 | 456 | 693.5 | 189.1 |
| S1+2 | 460 | 649.1 | 151.8 |
| ... | ... | ... | ... |

FIG. 12

| Y | OB OUTPUT BEFORE CLAMPING | OB OUTPUT AFTER CLAMPING | CLAMP AMOUNT | STEP AMOUNT α |
|---|---|---|---|---|
| VOB FINAL ROW (Y=S0) | 200 | 500 | 300 | |
| APERTURE PORTION FIRST ROW | 200 | | | |
| APERTURE PORTION SECOND ROW | 210 | | | |
| ... | ... | ... | ... | |
| S1 (SKIP ROW) | 450 | 750.0 | 300 | −250 |
| S1+1 | 456 | 506.0 | 298.5 | −250 |
| S1+2 | 460 | 508.5 | 296.4 | −250 |
| ... | ... | ... | ... | −250 |

FIG. 14

| SKIP POSITION / ISO SENSITIVITY | Y=S1 | Y=S2 | Y=S3 | ... |
|---|---|---|---|---|
| ISO100 | 4 | 2 | 2 | |
| ISO200 | 8 | 4 | 4 | |
| ISO400 | ... | ... | ... | |
| ... | | | | |

IMAGING APPARATUS

BACKGROUND OF THE INVENTION

1. Field of the Invention

The present invention relates to an imaging apparatus that includes an image sensor.

2. Description of the Related Art

Complementary metal-oxide-semiconductor (CMOS) image sensors have been recently often used in digital single lens reflex cameras and video cameras. These CMOS image sensors need to have an increased number of pixels, faster imaging speed, and greater ISO (higher sensitivity). A CMOS sensor having such a high number of pixels is very effective in imaging high definition still images. Recently the number of pixels has exceeded ten million. On the other hand, the number of pixels required for capturing a moving image is less than the number of pixels required for capturing a still image, and is about 300,000 for a normal moving image. Even for a moving image supporting the high vision of a full high-definition (HD) standard, this number is about two million pixels. Further, the frame rate is about 30 frames/second or 60 frames/second.

When capturing a moving image using a CMOS sensor with many pixels that is designed to capture still images, from a pixel number and frame rate perspective, it is typical to perform pixel thinning processing or pixel addition processing. Further, to read the pixel signals at high speed, a method in which only the areas of the image to be used are read by performing skip-reading is also employed. Generally, the imaging plane of a CMOS sensor is configured with a 3:2 aspect ratio. However, since the aspect ratio for high vision is 16:9, in high vision moving image mode, the top and bottom portions of the sensor are not used. Consequently, if the pixel signals are read while skipping the areas that are not used, the reading time can be shortened.

Further, as discussed in Japanese Patent Application Laid-Open No. 2009-17517, for example, there are also imaging apparatuses that include a mode for performing an enlarged display without reducing resolution by cutting the image at an arbitrary position in the imaging screen. In this case, a high speed display of 30 frames/second can be performed by skip-reading only the pixel signals in an arbitrary area, rather than reading the pixel signals of all of the pixels in the image sensor.

Usually, to obtain a signal (a black reference signal) serving as a signal level reference, an image sensor includes an optical black region (OB region) formed from a plurality of shielded optical black pixels (OB pixels) which do not to react to light. An HOB region is provided on the left side of the effective pixel region and a VOB region is provided on an upper portion of the effective pixel region. The calculation processing of the effective pixel signals is performed based on the signal level obtained at the optical black region by clamping the output signals of the OB pixels at a predetermined level. Specifically, dark current resulting from exposure for a long time and shading in the vertical direction of a dark-time signal can be corrected.

The operation for clamping OB pixel output at a predetermined level will now be described. Such an operation is discussed in, for example, Japanese Patent Application Laid-Open No. 2008-41776. First, while monitoring the signal output of the VOB region, a clamping operation is performed by providing feedback at a large gain so that the output signal rapidly reaches a predetermined target level (high speed clamping). Then, when clamping has been performed up to the target level, the monitoring region is moved to the HOB region, and the clamping operation is continued by providing feedback at a small gain so that the output signal for the HOB region slowly reaches a predetermined target level (low speed clamping). Thus, shading in the vertical direction can be corrected by performing low speed clamping for the HOB region.

However, when performing the drive for skip-reading as described above, if the vertical direction shading is large, an offset step is produced at the boundary between before and after skipping. If the low speed clamping is performed without considering the offset step, the clamp operation to the predetermined level may not be in time, so that unfinished corrections may remain at the upper portion of the screen.

SUMMARY OF THE INVENTION

The present invention is directed to providing an imaging apparatus capable of correcting a step produced by skip-reading.

According to an aspect of the present invention, an imaging apparatus includes an image sensor in which a plurality of pixels each outputting a signal based on a charge generated by photoelectric conversion, is arranged in a two-dimensional matrix, includes an aperture pixel region, a first light-shielded area provided on an upper portion of the aperture pixel region, and a second light-shielded area provided corresponding to each row in the aperture pixel region, a reading unit configured to read an image signal from the image sensor for each row, a selection unit configured to select a reading row of the image sensor, a correction unit configured to correct for each row a black level of the image signal read from the aperture pixel region based on a black level reference signal read from the second light-shielded area of a current read row and a black level reference signal read from the first light-shielded area or the second light-shielded area of a read row that is before the current read row, and a control unit configured to, when a read row of the image sensor is non-sequentially selected by the selection unit (selection means), perform control such that the correction unit corrects the black level of the image signal read from the aperture pixel region considering a step amount of a signal level occurring in the image signal read from the aperture pixel region of the non-sequentially read row.

Based on the above configuration, a step amount of before and after skip-reading can be suitably corrected, and a suitable image can be obtained in which a shading step in the vertical direction of the image is suppressed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates an OB clamping result for each row according to a conventional method.

FIG. 12 illustrates an OB clamping result for each row according to the first exemplary embodiment.

FIG. 14 illustrates a table of step amounts according to a second exemplary embodiment.

DESCRIPTION OF THE EMBODIMENTS

Various exemplary embodiments, features, and aspects of the invention will be described in detail below with reference to the drawings.

Figure 1:
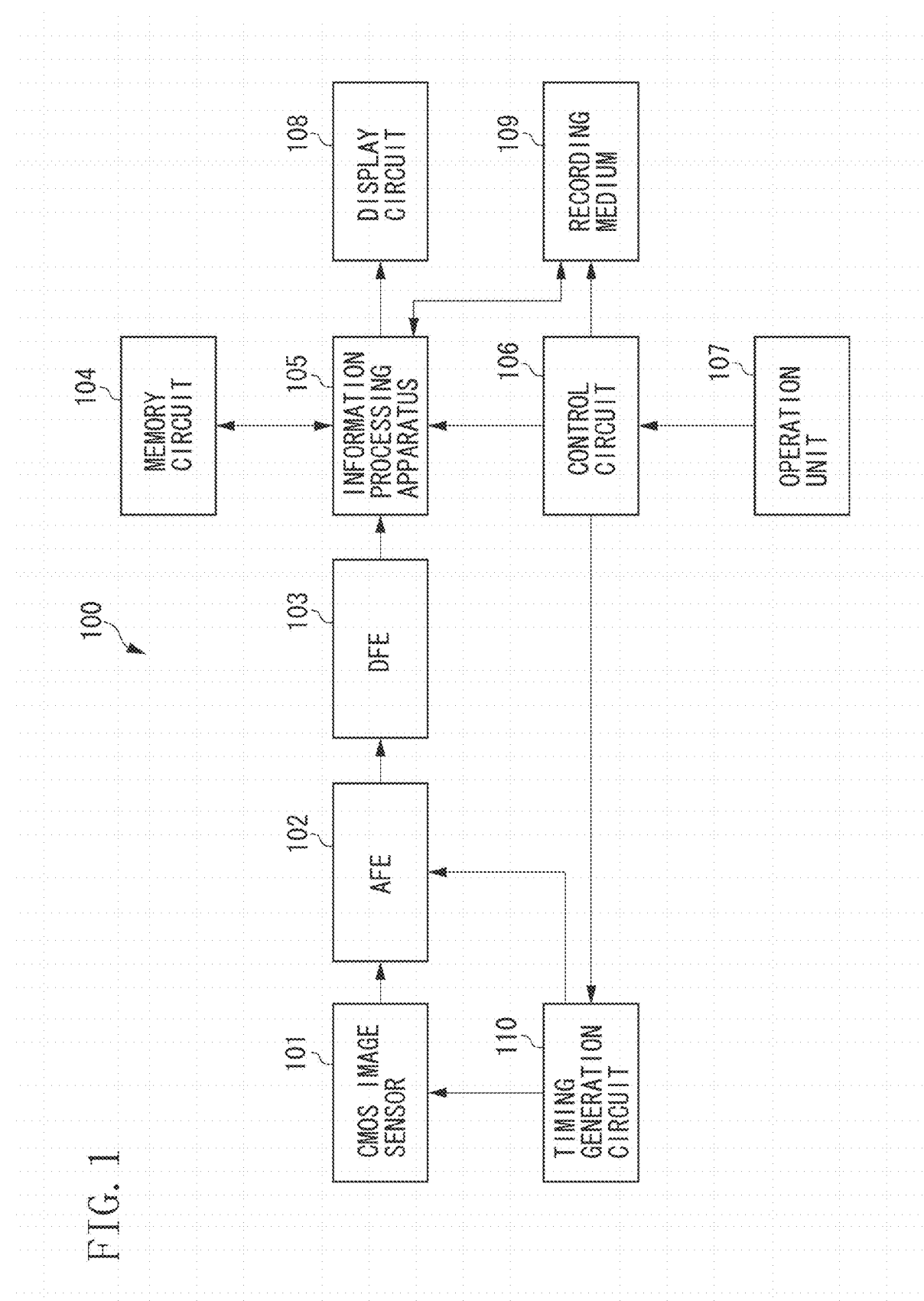
FIG. 1 is an overall block diagram of a solid imaging apparatus according to a first exemplary embodiment of the present invention.

FIG. 1 is an overall block diagram of a solid imaging apparatus according to a first exemplary embodiment of the present invention. In FIG. 1, a CMOS image sensor 101 converts an object image formed by a (not illustrated) imaging lens into an image signal, and outputs the image signal. An analog front end (AFE) 102 is a signal processing circuit that performs amplification and black level adjustment (OB clamping) of the image signal output from the image sensor. The AFE 102 receives OB clamp timing and an OB clamp target level from a timing generation circuit 110, and based on the received information performs image signal processing. Further, the AFE 102 converts the processed analog image signal into a digital image signal. A digital front end (DFE) 103 performs digital processing such as correction of the digital image signal and pixel re-arrangement for each pixel converted by the AFE 102. Further, OB clamping can also be performed by the DFE 103.

An information processing apparatus 105 performs processing such as outputting an image to a display circuit 108 by performing development on an image signal output from the DFE 103, and processing for recording on a recording medium 109 via a control circuit 106. The control circuit 106 performs controls such as receiving instructions from an operation unit 107 and sending commands to the timing generation circuit 110.

CompactFlash™ can be used for the recording medium. A memory circuit 104 is used as a work memory for the information processing apparatus 105 at the development stage. The memory circuit 104 is also used as a buffer memory for development processing performed when imaging is continuously performed. The operation unit 107 includes a power switch for starting the digital camera and a shutter switch.

The shutter switch instructs imaging preparation operations, such as metering and focusing, to start. Further, the shutter switch issues an instruction to start a series of imaging operations for processing the signals read from the image sensor 101 by driving a mirror and a shutter and reading the read signals. In addition, the operation unit 107 also includes a setting switch for setting various imaging conditions (exposure conditions such as shutter speed and aperture, and ISO sensitivity).

Figure 2:
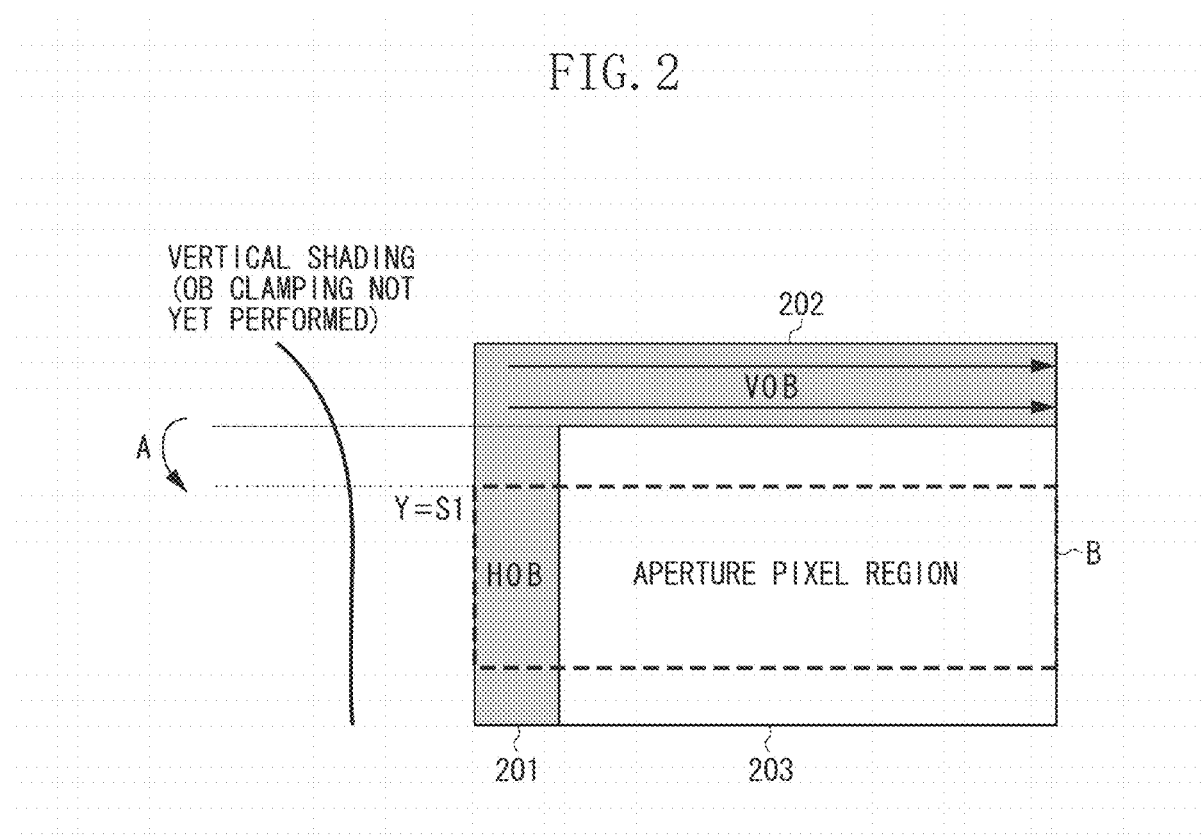
FIG. 2 illustrates a configuration example of a pixel region in a solid imaging apparatus.

FIG. 2 illustrates a configuration example of a pixel region in a solid imaging apparatus. As illustrated in FIG. 2, a solid image sensor according to the present exemplary embodiment includes an aperture pixel region 203, a horizontal direction optical black region (HOB) 201, and a vertical direction optical black region (VOB) 202. The aperture pixel region 203 accumulates charges generated by incident light and outputs an image signal.

The HOB 201 is a light-shielded pixel area provided adjacent to the head of the aperture pixel region 203 in a vertical direction. The VOB 202 is a light-shielded pixel area provided adjacent to the head (on the left side) of the aperture pixel region 203 in a horizontal direction. The aperture pixel region 203, the HOB 201, and the VOB 202 have the same configuration, differing in that the aperture pixel region 203 is not shielded from light while the HOB 201 and the VOB 202 are shielded from light. The signals from the pixels are read from the top left of FIG. 2, as indicated by the arrow.

Figure 3:
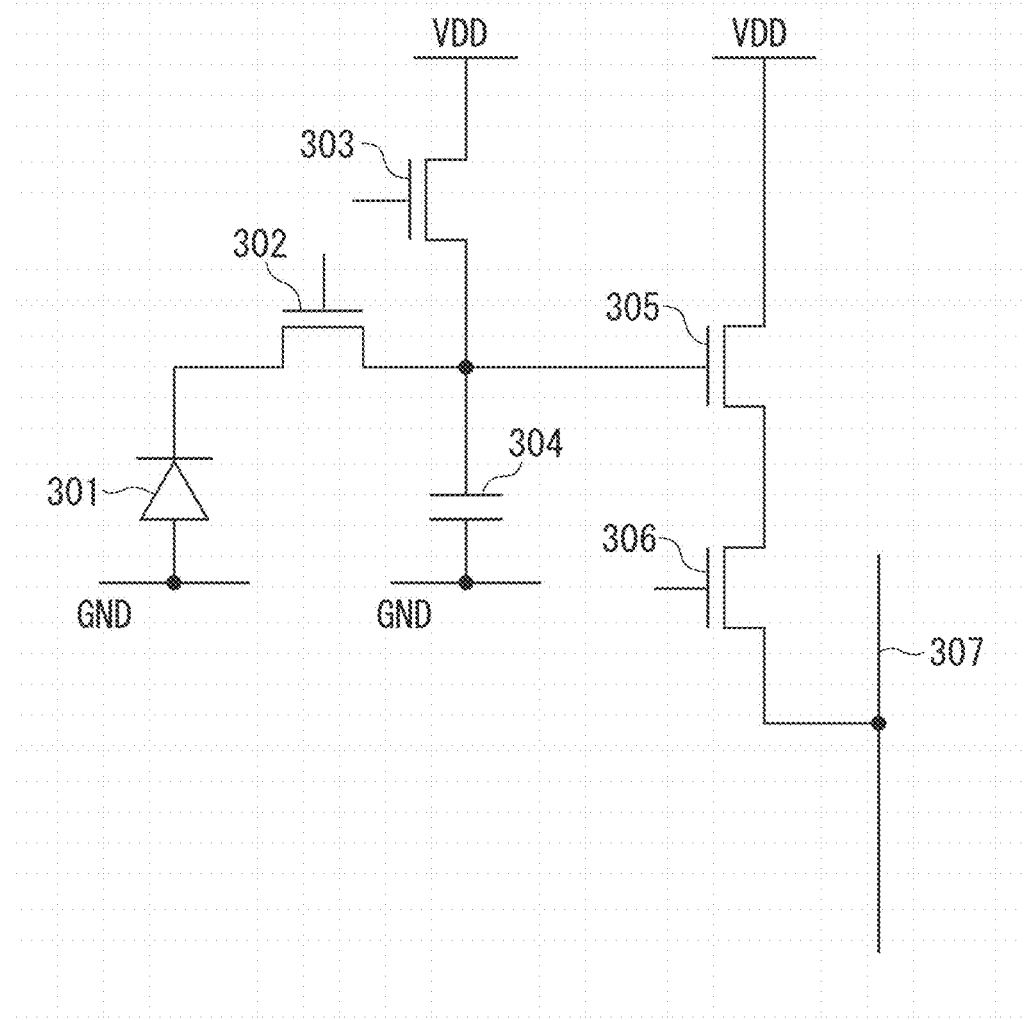
FIG. 3 is a circuit diagram of a pixel unit (one pixel) in a CMOS image sensor.

FIG. 3 illustrates an example of a pixel unit (one pixel) circuit in a CMOS image sensor. A photodiode (PD) 301 generates and accumulates charges by receiving a light image formed by an imaging lens. The charges accumulated by the PD 301 are transferred to a floating diffusion (FD) node 304 via a transfer switch 302 configured from a MOS transistor. The charges are converted into a voltage at the FD node 304, which is output from a source follower amplifier 305. A selection switch 306 outputs one row of pixel output collectively to a vertical output line 307. A reset switch 303 resets the electric potential of the FD node 304, and via the transfer switch 302, the electric potential of the PD 301 to an electric potential VDD.

Figure 4:
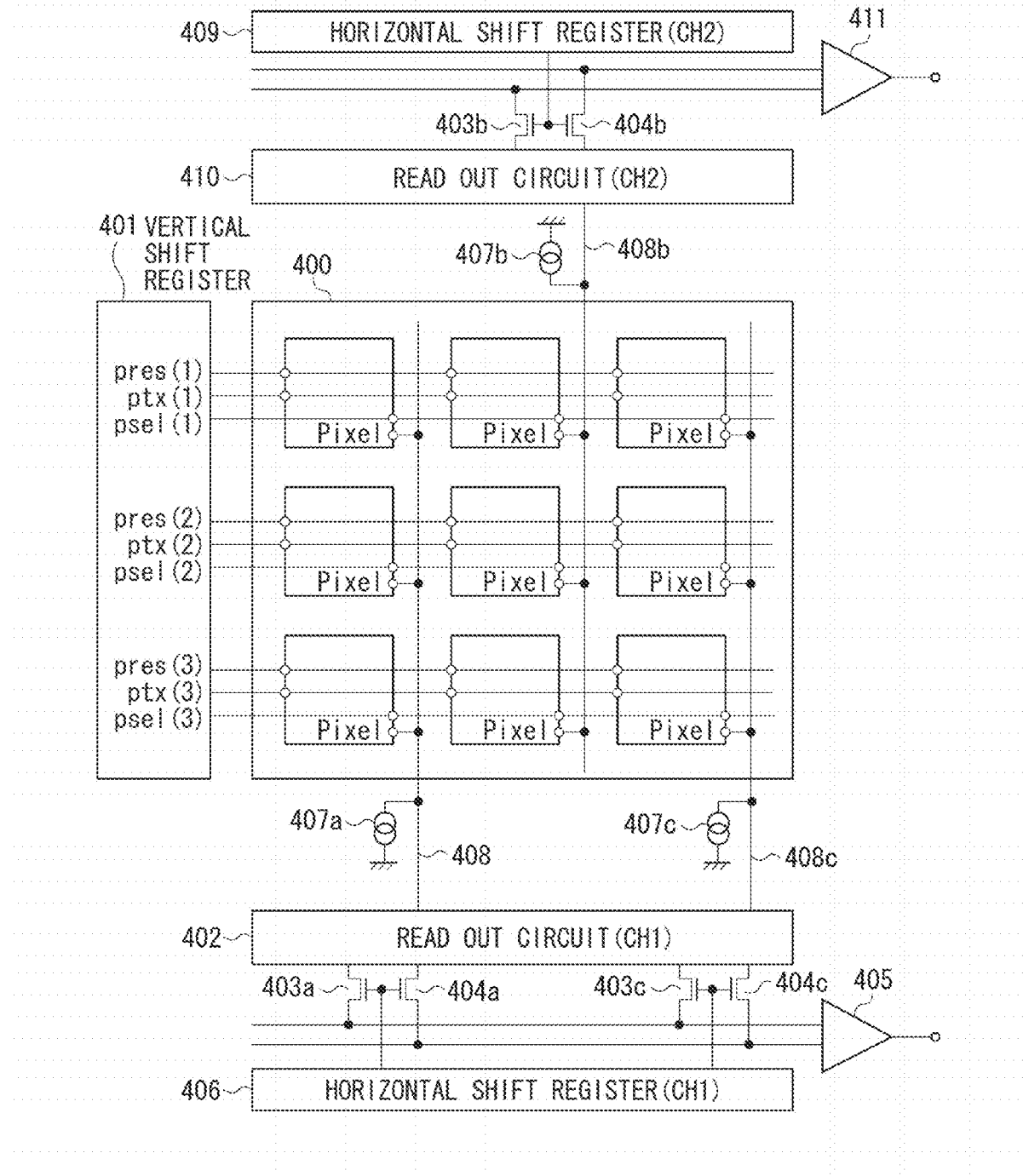
FIG. 4 is a block diagram illustrating a configuration example of an entire CMOS image sensor.

FIG. 4 is a block diagram illustrating a configuration example of the entire CMOS image sensor. In FIG. 4, a vertical shift resistor 401 outputs signals, such as row selection lines Pres, Ptx, and Psel, to a pixel region 400. The pixel region 400 includes a plurality of pixel cells Pixel. Each pixel cell Pixel is configured as illustrated in FIG. 3. A pixel signal is output to the vertical signal lines of CH1 and CH2, respectively, for even columns and odd columns. A power source 407 is connected to each vertical signal line 408. A readout circuit 402 outputs pixel signals input from the vertical signal lines 408 to a differential amplifier 405 via an n-channel MOS transistor 403, and outputs a noise signal to the differential amplifier 405 via an n-channel MOS transistor 404. A horizontal shift resistor 406 controls the on/off of the transistors 403 and 404. The differential amplifier 405 outputs the difference between the pixel signal and the noise signal.

The gates of the transfer switch 302 for the plurality of pixel cells Pixel in the first row are each commonly connected to a first row selection line Ptx1 arranged extending in a horizontal direction. Further, the gates of the reset switch 303 for the plurality of pixel cells Pixel on the same row are each commonly connected to a second row selection line Pres1 arranged extending in a horizontal direction. In addition, the gates of the selection switch 306 for the plurality of pixel cells Pixel in the same row are each commonly connected to a third row selection line Psel1 arranged extending in a horizontal direction. These first to third row selection lines Ptx1, PRes1, and Psel1 are connected to and driven by the vertical shift resistor 401. For the remaining rows illustrated in FIG. 4 too, the transfer switch 302 gate, the reset switch 303 gate, and the selection switch 306 gate for the respective pixel cells Pixel are commonly connected to row selection lines Ptx2 to Ptx3, Pres2 to Pres3, and Psel2 to Psel3.

The source of the selection switch 306 is connected to a terminal Vout of a vertical signal line arranged extending in a vertical direction. The source of the selection switch 306 for the other pixel cells Pixel arranged in the same column is also connected to a terminal Vout of the vertical signal line. The terminal Vout of the vertical signal line is connected to a constant current source 407, which is a load means.

Figure 5:
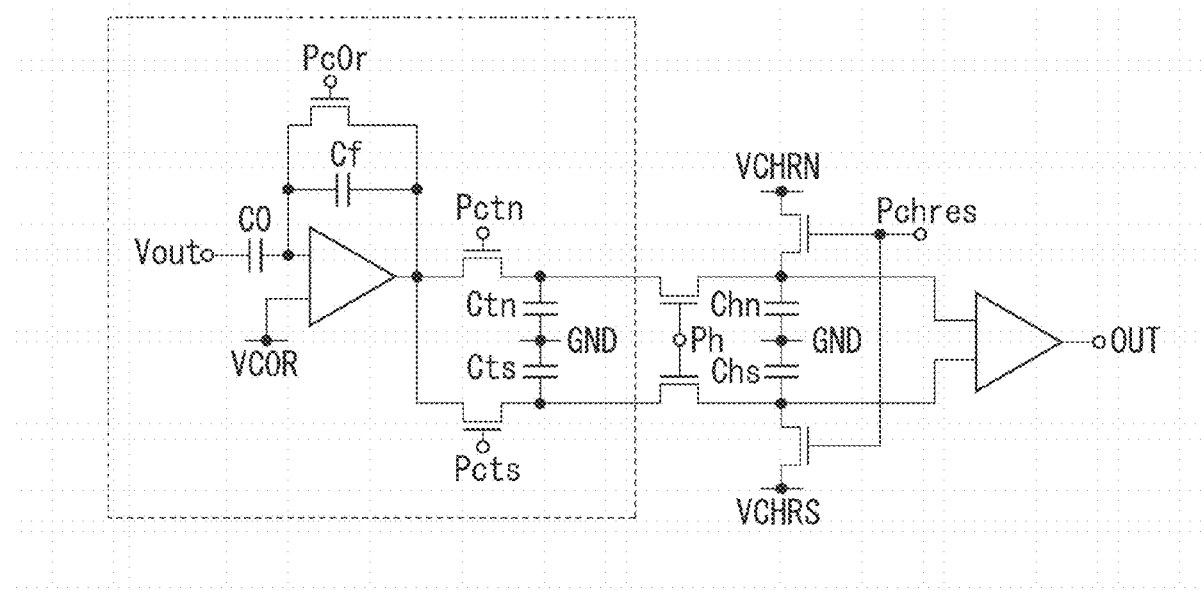
FIG. 5 illustrates a readout circuit.

FIG. 5 is a circuit example of one column of the blocks of the readout circuit 402 (410) illustrated in FIG. 4. The number of sections enclosed by the dotted line matches the number of columns. The terminal Vout is connected to each vertical signal line.

Figure 6:
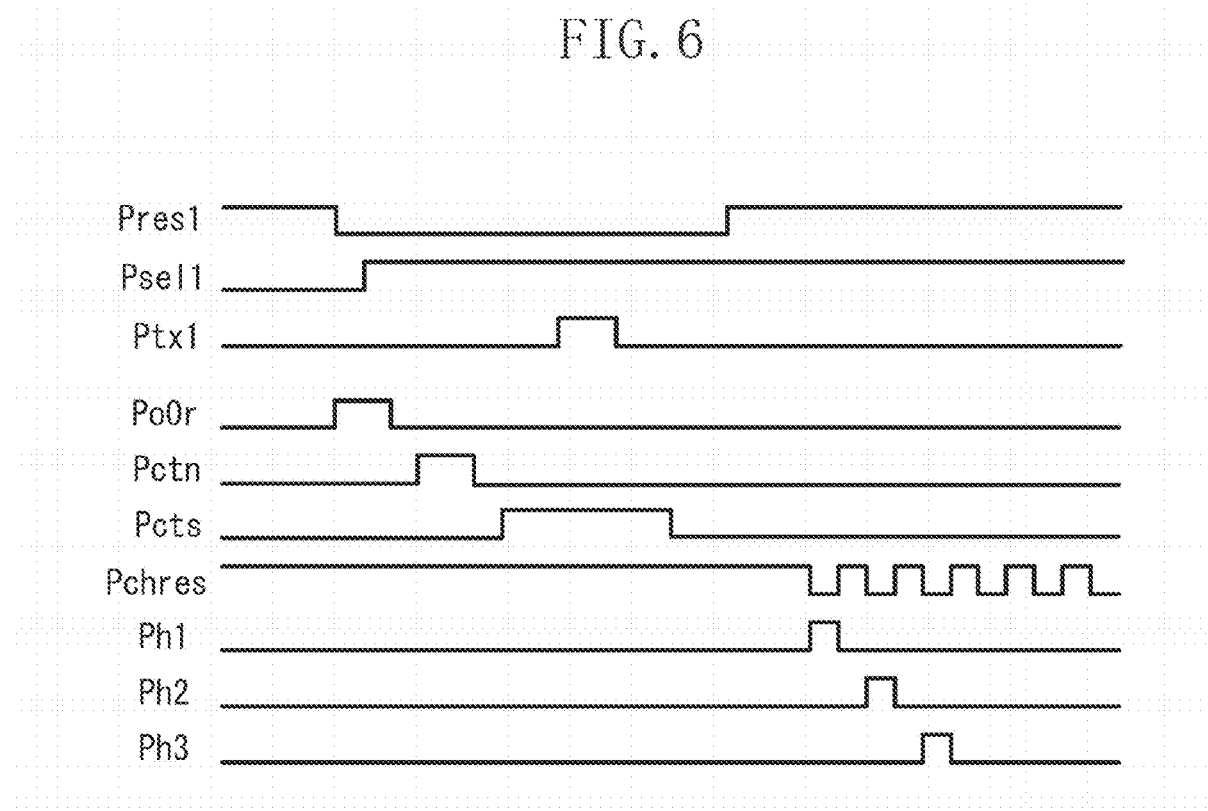
FIG. 6 is a drive timing chart of a solid imaging apparatus.

FIG. 6 is a timing chart illustrating a read operation example of a CMOS image sensor. Before reading the signal charge from the PD 301, the gate line Pres1 of the reset switch 303 is set to a high level. Consequently, the PD 301 and the FD node 304 gates are reset to the reset power voltage VDD. When the gate line Pres1 of the reset switch 303 returns to a low level, the gate line PcOr (FIG. 5) of the clamp switch simultaneously is set to a high level. Then, the gate line Psel1 of the selection switch 306 is set to a high level. Consequently, the reset signal (noise signal) superimposed with reset noise is read into the vertical signal line Vout, and clamped at the clamp capacity of each column.

Next, after the gate line PcOr for the clamp switch has returned to a low level, a gate line Pctn for a noise signal side transfer switch is set to a high level, and a reset signal is stored in a noise storage capacity Ctn provided on each column. Next, after a gate line Pcts for an image pixel side reset switch has been set to a high level, the transfer switch 302 gate line Ptx1 is set to a high level, so that simultaneously with transfer of the signal charge of the PD 301 to the gate of the source follower amplifier 305, a voltage signal based on the transferred charge is read into the vertical signal line Vout. Then, after the transfer switch 302 gate line Ptx1 has returned to a low level, the gate line Pcts for the image signal side transfer switch is set to a low level.

Consequently, the amount of change from the reset signal (light signal component) is read into a signal storage capacity Cts provided on each column. Based on the operations up to this point, the signals for the pixels Pixel connected to the first row are stored in the signal storage capacities Ctn and Cts connected to each column.

Subsequently, based on a signal Ph supplied from the horizontal shift resistor 406 (409), the horizontal transfer switch gates on each column are sequentially set to a high level. The voltage signals stored in the signal storage capacities Ctn and Cts are sequentially read into the horizontal output lines Chn and Chs, subjected to difference processing by an output amplifier, and sequentially output to an output terminal OUT. During a period between the readings of the signals of each column, the horizontal output lines Chn and Chs are reset to the reset voltages VCHRN and VCHRS by the reset switch.

Based on the above operations, the reading of the pixel cells Pixel connected on the first row is completed. Then, the reading of all the pixel cells Pixel is completed in the same manner by sequentially reading the signals of the pixel cells Pixel connected on the second and subsequent rows based on the signals from the vertical shift resistor 401. The skip-reading described below can be performed by connecting desired rows based on signals from the vertical shift resistor 401.

Figure 7:
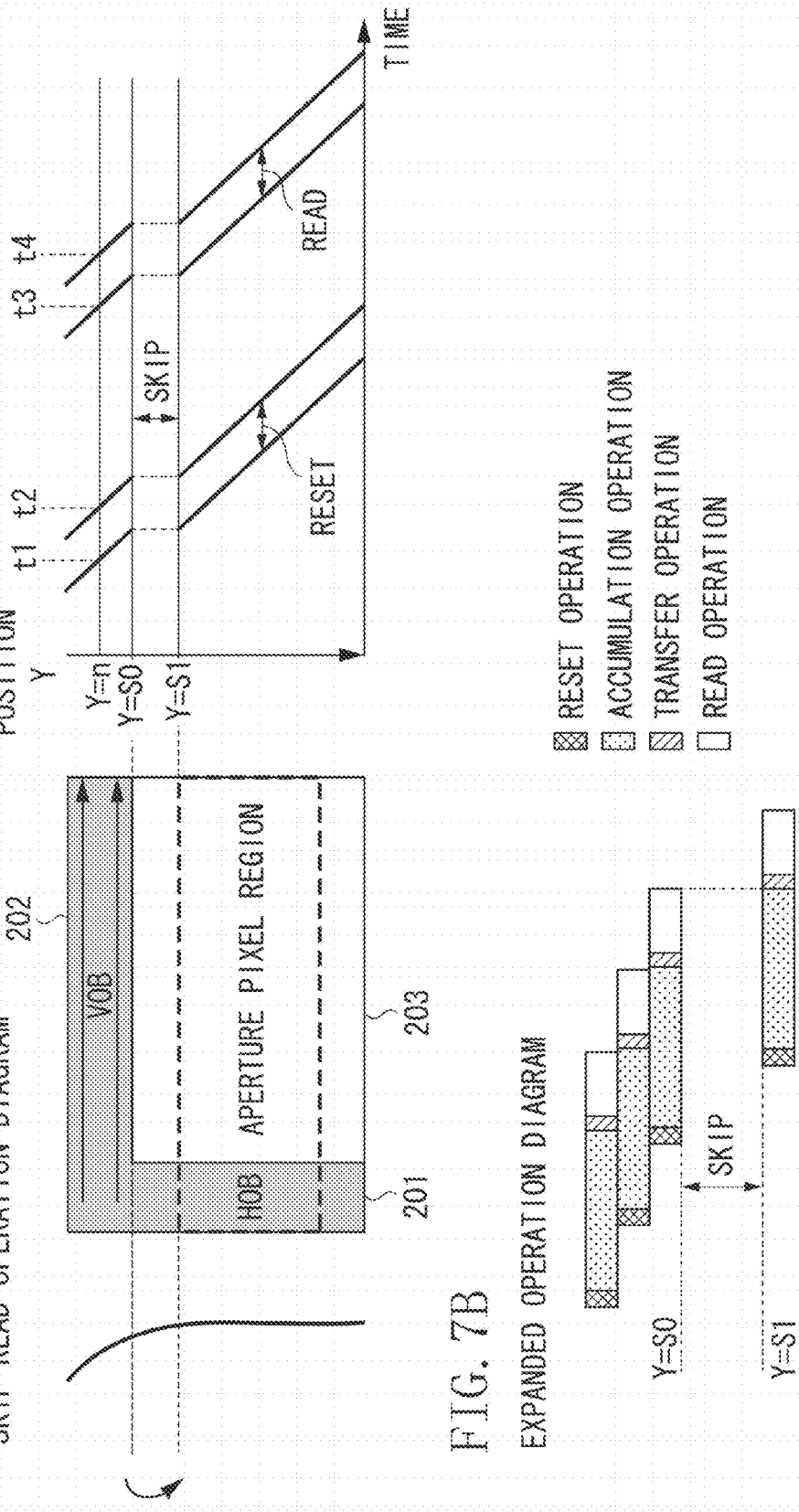
FIGS. 7A and 7B are operation schematic diagrams of a skip-reading imaging mode.

Next, the skip-reading operation of the imaging apparatus according to the present exemplary embodiment illustrated in FIGS. 1 to 6 will be described. FIG. 7A schematically illustrates an operation in a skip-reading imaging mode based on a rolling drive by the imaging apparatus 100 illustrated in FIG. 1.

In FIG. 7A, the horizontal axis represents time, and the vertical axis represents the position of a row on the CMOS image sensor 101. An example of an operation will be described in which Y=n-th row selected by the vertical shift resistor 401. At the n-th row, first, the transfer switch 302 and the reset switch 303 are switched on for the interval from time t1 to time t2, and then a reset operation is performed to remove unnecessary charge accumulated in the n-th row PD 301 and FD node 304.

At time t2, the transfer switch 302 is switched off, and an accumulation operation starts in which the PD 301 accumulates photocharge. The accumulation operation is performed until time t3. At time t3, photocharge transfer and a read operation are started. These operations are performed as described above, based on the timing chart illustrated in FIG. 6.

The reading time is the time from transfer start at time t3 until reading finish at time t4. The above is the series of operations performed from accumulation until reading at an n-th row. The operations for the n+1-th row are sequentially driven so that the transfer and the reading of the n+1-th row are started from time t4, when the n-th row reading is finished.

Next, skip-reading will be described. FIG. 7B is an enlarged diagram illustrating the operation sequence performed when an S1-th row is skipped after the S0-th row has been read. After the reset operation of the S0-th row has finished, the vertical shift resistor performs a reset operation for the S1-th row by applying PRES (S1) and PTX (S1), and then drives the reset operation, the accumulation operation, the transfer operation, and the read operation in the same manner as the n-th row. The S1-th row read operation starts after the reading of the S0-th row has finished. The operations for the subsequent rows are driven in the same manner. Consequently, by reading only the necessary regions, one piece of an image or an image of one frame can be quickly read.

Figure 8:
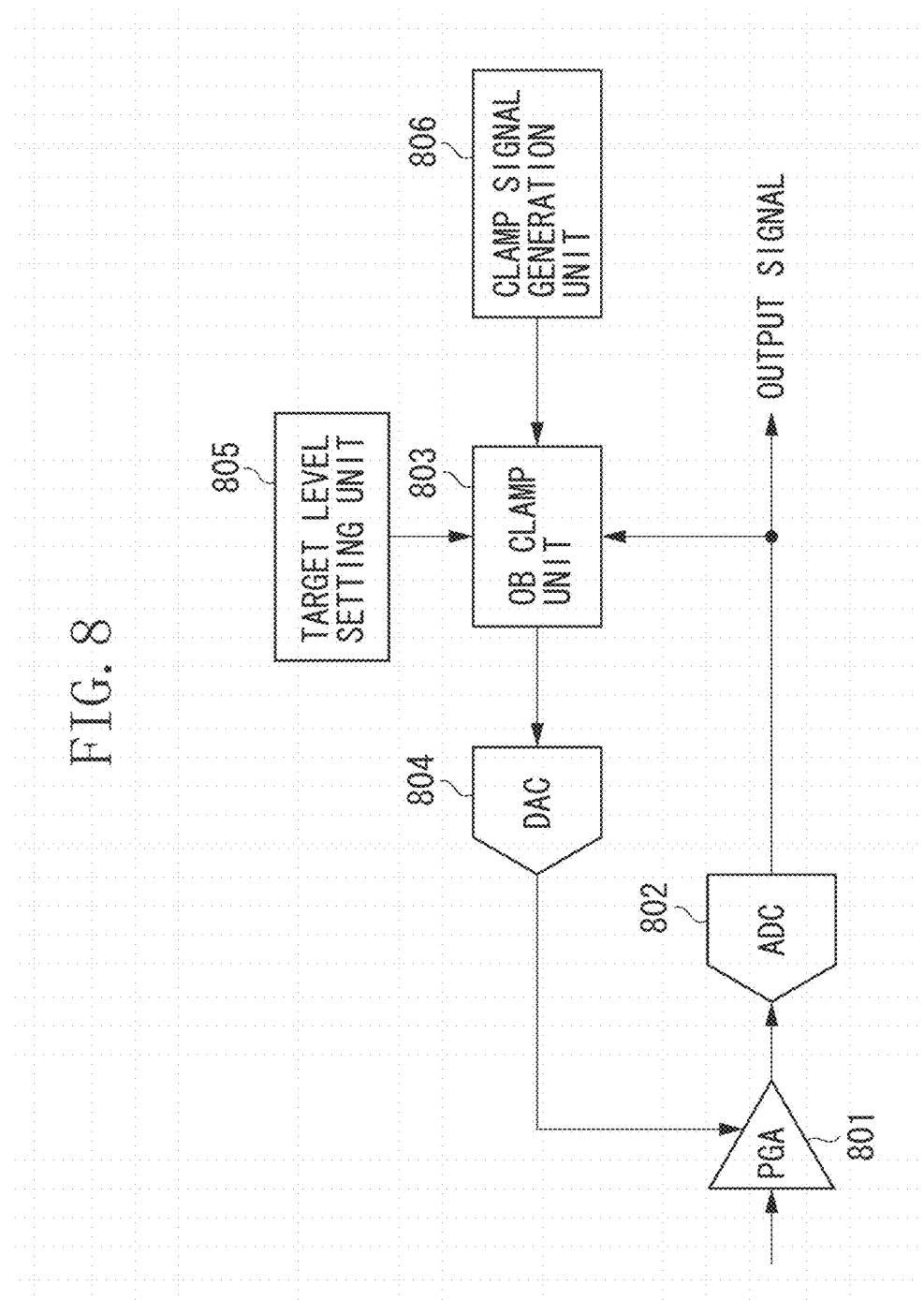
FIG. 8 is a block diagram of offset clamping based on AFE.

FIG. 8 is a block diagram of a signal processing circuit (the AFE 102 in FIG. 1), which illustrates offset clamping by an AFE. An output signal from the CMOS image sensor 101 is amplified by a programmable gain amplifier (PGA) 801. During this operation, a reference signal is supplied by converting a digital signal generated by an OB clamp unit 803 into an analog signal with a digital-to-analog converter (DAC) 804. An analog-to-digital converter (ADC) 802 converts an output signal from the PGA 801 from an analog format into a digital format, and outputs the resultant digital signal.

At the OB clamp unit 803, a clamp target value is input from a target level setting unit 805, and an output signal is output from the ADC 802. Further, the OB clamp unit 803 generates a reference signal in the direction in which the difference between the above output signal and the target value becomes zero, i.e., a reference signal in which the output signal from the optical black regions (VOB region, HOB region) of the CMOS image sensor approaches the clamp target value by a value obtained when the above difference is multiplied by a predetermined gain (hereinafter, this value will be referred to as "clamp amount").

This operation is performed while the signal from a clamp signal generation unit 806 is being input. The predetermined gain is about ½ to ¹⁄₆₄. The DAC 804 converts the reference signal generated by the OB clamp unit 803 from a digital format into an analog format, and outputs the resultant analog signal to the PGA 801. Consequently, a reference voltage of the signal input into the PGA 801 is determined. At the ADC 802, the amplified sensor signal is converted into a digital signal. As described above, although the target level setting unit 805 inputs the OB region clamp target value into the OB clamp unit 803, this value can be arbitrarily set.

The HOB clamp processing will now be described in more detail. First, a conventional OB clamp method will be described for comparison with the present exemplary embodiment. A clamp amount OBC(i) for a Y=i-th row is determined based on the following Equation 1.

$$OBC(i)=OBC(i-1)+(Darklevel-OB(i))*FBG \quad \text{(Equation 1)}$$

OB (i) is the average value of the OB pixel output after clamping of the i−1-th row used for OB clamping of the i-th row. OBC (i−1) is the clamp amount of the i−1-th row. Darklevel is a reference black level. FBG is a feedback gain of the HOB clamp. Further, using the clamp OBC (i) calculated based on Equation 1, the output of a pixel in an aperture region of the i-th row and the output of an OB pixel of the i+1-th row are clamped based on the equation represented by Equation 2.

$$\text{Signal (after clamping)=Signal (before clamping)+} OBC(i) \quad \text{(Equation 2)}$$

FIG. 10 illustrates the results of processing the average value of the OB outputs when the OB clamping of each row is yet to be performed (OB output before clamping) and the average value of the OB outputs after clamping has been performed based on a conventional method (OB output after clamping) based on Equations 1 and 2. In FIG. 10, the reference black level Darklevel is 500 LSB, and the HOB clamp feedback gain FBG is ¼ (=0.25). Further, the OB clamp amount at the VOB final row is +300 LSB.

In FIG. 10, after the pixel signal of the VOB region 202 illustrated in FIG. 2 is read, the pixel region of the arrow A is skipped, and the pixel signal of the pixel region B enclosed by the dotted line is read. On the left side of the pixel region in FIG. 2, a state of the vertical shading before OB clamping is illustrated.

When imaging is performed in a state set to a high ISO sensitivity (imaging sensitivity), as illustrated in FIG. 2, the shading can be large. If vertical skip-reading is executed in such a large vertical shading state, a large step is produced in the OB output. For example, the before-clamping OB output at the Y=S1 row, which is the read row after skipping, is 450 LSB. This is 250 LSB different from the 200 LSB for the before-clamping OB output at the Y=S0 row, which is the read row before skipping.

By performing OB clamp processing on the Y=S1 row based on Equation 2, clamping is performed for a clamp amount of 300 LSB, so that the after-clamping OB output is 750 LSB. In this case, if HOB clamping is started from the S1-th row, the clamp amount calculated based on Equation 1 is as follows.

$$OBC(S1)=300+(500-750)*0.25=237.5$$

Figure 11:
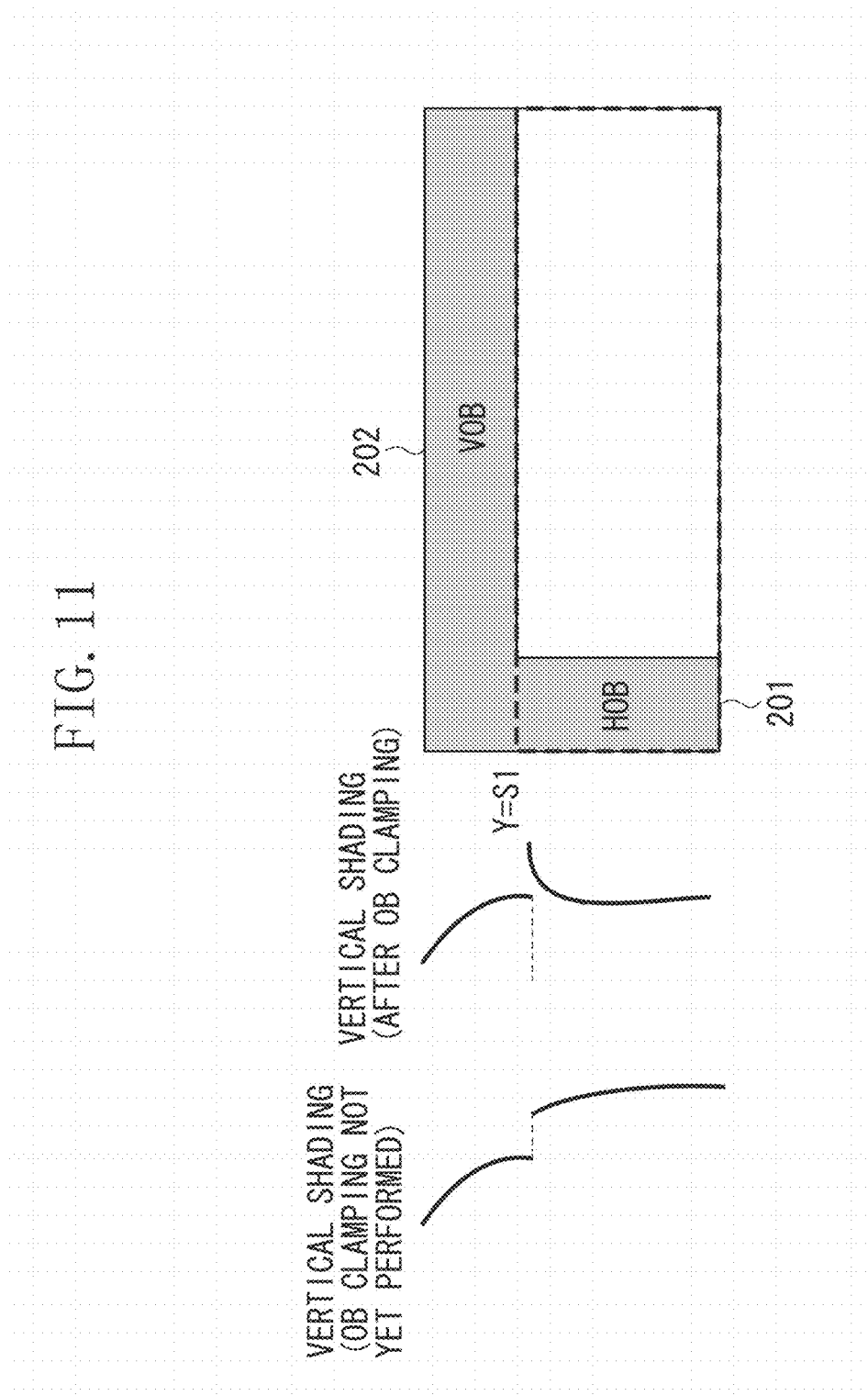
FIG. 11 illustrates vertical shading after OB clamping according to a conventional method.

If the calculated clamp amount is reflected in the HOB output for the next row based on Equation 2, the after-clamping OB output for the Y=S1+1-th row is 693.5 LSB. Further, the next clamp amount is calculated as 189.1 LSB, and the after-clamping OB output for the Y=S1+2-th row is 649.1 LSB. Specifically, even by the S1+2-th row, the OB output is quite a bit larger than the 500 LSB of the reference black level. FIG. 11 illustrates a state of vertical shading before OB clamping is executed and vertical shading after OB clamping is executed for an image output by skip-reading. FIG. 11 shows that the vertical shading immediately after skipping becomes very large if normal OB clamping is also performed after skip-reading.

Figure 9:
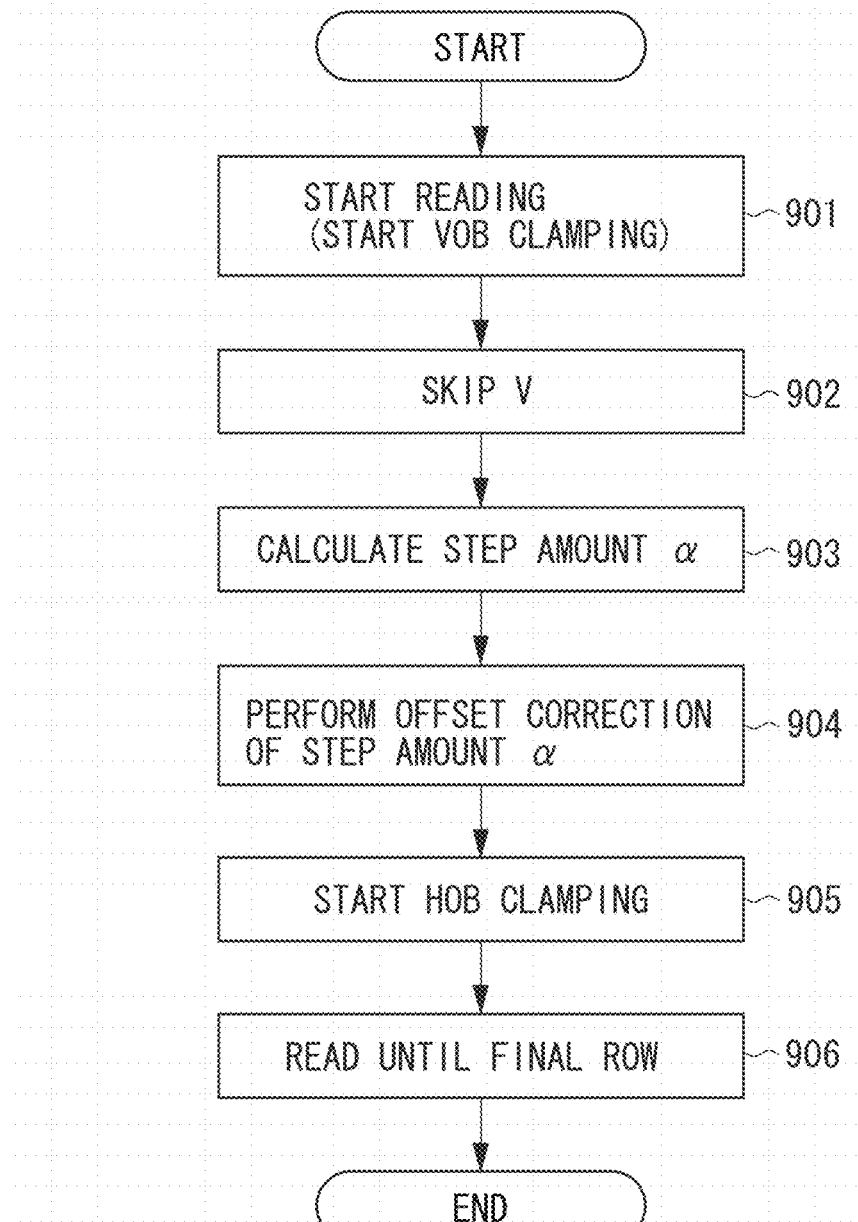
FIG. 9 is a flowchart illustrating the first exemplary embodiment.

Accordingly, in the present exemplary embodiment, when the ISO sensitivity (imaging sensitivity) is set higher than a predetermined ISO sensitivity (e.g., ISO 25600), control is performed so as to correct the step heights that are produced in vertical skip-reading. FIG. 9 is a flowchart illustrating a step correction operation in the vertical skip-reading according to the first exemplary embodiment. Although this processing may be executed based on control performed by the AFE 102 or the DFE 103 illustrated in FIG. 1, in the present exemplary embodiment an example will be described in which the processing is performed by the AFE 102. Further, after the pixel signal of the VOB region 202 illustrated in FIG. 2 is read, the pixel region of the arrow A is skipped, and the pixel signal of the pixel region B enclosed by the dotted line is read.

In FIG. 9, first, in step S901, the AFE 102 starts the reading of the signals from the CMOS image sensor 101. The signals read from the image sensor are input into the AFE 102. VOB clamping is executed during the OB signal reading period from the VOB 202. Specifically, the clamp processing proceeds based on a value obtained by calculating the difference between the signal level of the pixel in the VOB region and the CLAMP signal level (reference black level) output from the timing generation circuit, and multiplying that difference by a predetermined feedback gain.

In step S902, if the reading of the final row in the VOB 202 (the Y=S0 of FIG. 7) is completed, the processing skips a predetermined row (Y=S1) and performs reading. This reading drive is executed based on a non-sequential selection of the predetermined reading row by the vertical shift resistor 401. During this operation, the average value of the pixel output of the final row (Y=S0) of the VOB 202 is calculated and stored in the memory.

Next, in step S903, the AFE 102 calculates the difference between the calculated average value X (S1) of the pixel output of the HOB 201 for the Y=S1 row after the skipping and the average value X (S0) of the pixel output of the VOB 202 for the Y=S0 row before the skipping, i.e., the AFE 102 calculates a step amount α.

FIG. 12 illustrates an output for each row (OB output before clamping) and an output of an OB clamping result (OB output after clamping) according to the first exemplary embodiment. The after-clamping HOB output for the Y=S1 row, which is the read row immediately after the skipping, is 750 LSB. Specifically, when the difference between the OB output of 500 LSB for the Y=S0 row, which is the final row of the VOB 202, and the OB output of 750 LSB for the Y=S1 row, which is the skipped row is calculated, the step amount α=−250 LSB.

Next, in step S904, the pixel output of the aperture region for the Y=S1 row is subjected to offset correction based on the step amount α calculated in step S903. By performing offset correction based on the step amount α, the pixel output of the aperture region for the i-th row and the pixel output of the OB pixel for the i+1-th row are represented by Equation 3.

Signal (after clamping)=Signal (before clamping)+
OBC(*i*)-α                                              (Equation 3)

By performing OB clamp processing while considering the step amount α, the OB output for the Y=S1+1-th row is, based on Equation 3, 456+300−250=506.0 LSB. Then, in step S905, HOB clamping is started from the Y=S1+1-th row. The clamp amount calculated based on Equation 1 is as follows.

OBC(S1+1)=300+(500−506)*0.25=298.5

Further, by performing the OB clamp processing based on Equation 3, the after clamping OB output for the Y=S1+2-th row is 460+298.5−250=508.5 LSB. In step S906, the similar processing is repeated until the final row is read.

Figure 13:
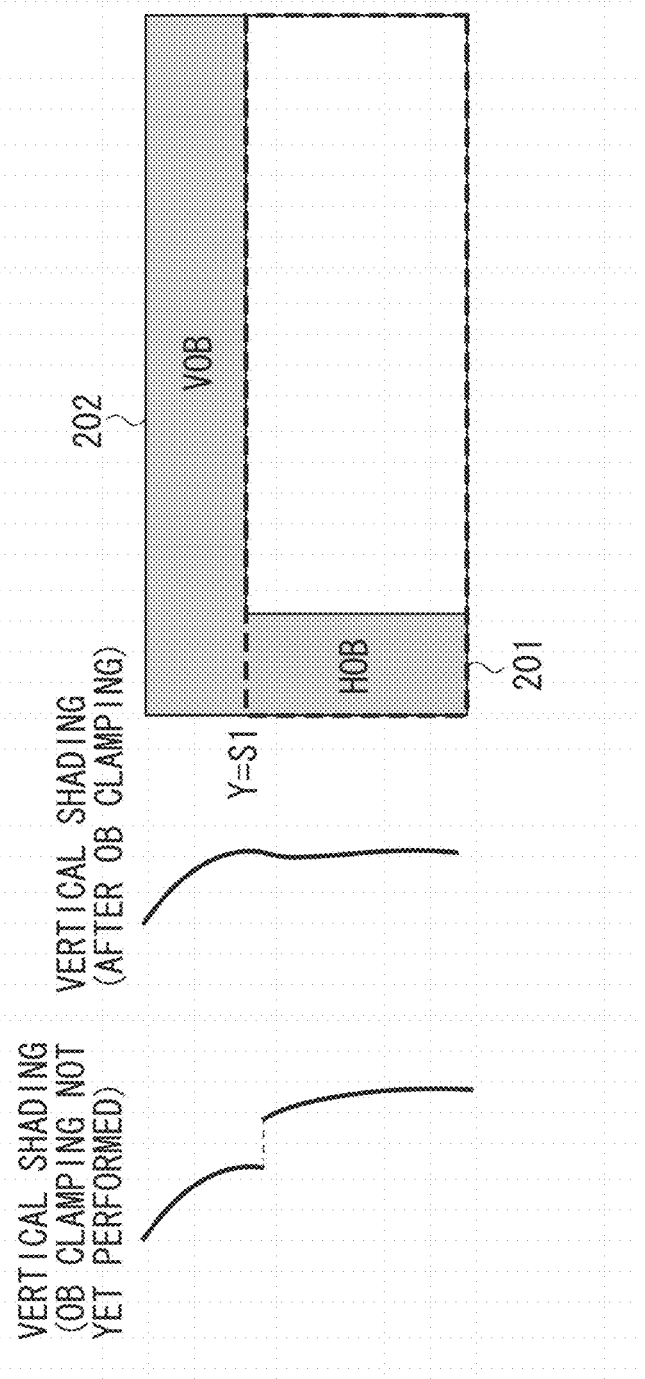
FIG. 13 illustrates vertical shading after OB clamping according to the first exemplary embodiment.

FIG. 13 illustrates vertical shading before OB clamping is executed and vertical shading after OB clamping is executed. From FIG. 13, it can be seen that by performing offset correction based on the step amount α before and after the skipping, although there is some variation in the output, immediately after the skipping the output quickly approaches the reference black level.

For moving image imaging (live view mode), the step amount α can be updated by averaging the values of a plurality of frames. For example, the step amount α for an n-th frame can be calculated by storing the value of the step amount α for the previous four frames (i.e., α(n-4), α(n-3), α(n-2), and α(n-1)), and calculating the average of the step amount α for the n-th frame. Further, when averaging the previous four frames, for example, although there may not be enough step amount data to average the first few frames, this processing can be performed as follows.

First frame α=α(1)

Second frame α={α(1)+α(2)}/2

Third frame α={α(1)+α(2)+α(3)}/3

Fourth frame α={α(1)+α(2)+α(3)+α(4)}/4

Fifth frame onwards (*n*-th frame) α={α(*n*-4)+α(*n*-3)+α(*n*-2)+α(*n*-1)}/5

Thus, by performing OB clamp processing that reflects a step amount before and after skipping, a suitable image can be obtained in which the occurrence of vertical shading steps is suppressed. This processing may be performed on a personal computer (PC) rather than in the camera. Further, when capturing a moving image, by calculating the average of several frames, the step amount α can be suitably obtained even for a high ISO with a lot of noise. Although a detailed description is omitted in the present exemplary embodiment, when capturing a moving image, in addition to a non-thinning operation, the present invention can also be applied to skip-reading in a thinning operation or a vertical addition operation.

A second exemplary embodiment according to the present invention will now be described. Other than the step for acquiring the step amount α, the processing is the same as in the first exemplary embodiment, so a description thereof will be omitted here. In the present exemplary embodiment, the step amount α is acquired in advance when the apparatus is shipped from the factory, for example, and stored in the memory circuit 104 of the imaging apparatus. At this stage, since the step amounts are different depending on the skip position, a step amount is detected and held for all of the skip positions to be used in moving image mode and enlargement mode. FIG. 14 is a table of step amounts. Although this table shows various step amounts based on parameters of skip position and ISO sensitivity (imaging sensitivity), the table is not limited to these parameters. For example, various imaging conditions, such as the temperature, may also be used.

Instead of calculating the step amount α in step S903 of the flowchart illustrated in FIG. 9, offset correction is performed in step S904 by acquiring a step amount α corresponding to the imaging condition and skip position from the step amount table illustrated in FIG. 14. Thus, a suitable image and moving image can also be obtained in which the occurrence of vertical shading is suppressed by storing in advance a step amount before and after skipping in the memory unit of the imaging apparatus and performing correction by reading the step amount during imaging.

A third exemplary embodiment according to the present invention will now be described. Other than the step for acquiring the step amount α, the processing is the same as in the first exemplary embodiment, so a description thereof will be omitted here. In the present exemplary embodiment, correction data for all rows that takes into consideration a skip operation is acquired in advance when the apparatus is shipped from the factory, for example, and stored in the memory circuit 104 of the imaging apparatus. Specifically, during manufacture at the factory, a light-shielded image is acquired by setting the apparatus to an imaging mode that includes skip-reading, a vertical direction map is calculated from the average value of each row, and the map is stored in the memory as correction values. In addition to an OB portion, an output from the aperture region may also be used in the mapping calculation. Since the larger a number of parameters, the better in calculating the average value, when an aperture region is used, a correction value with little error can be calculated. Further, it is desirable to obtain a correction value for every different imaging condition of the skip positions.

Further, offset correction is performed at each row during the imaging by reading a correction value based on an imaging condition. Specifically, a correction value is uniformly subtracted for each row from the one frame amount of read image data. Since the read correction value takes into consideration skip-reading, vertical shading correction can be performed that includes a step amount before and after skipping. In addition, if OB clamping is also performed, vertical shading due to temperature changes and the like can be corrected in real time, thus enabling a good image to be obtained.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-265073 filed Dec. 2, 2011, which is hereby incorporated by reference herein in its entirety.

What is claimed is:

1. An imaging apparatus comprising:
pixel regions which include an aperture pixel region, a first light-shielded pixel region provided on a first side of the aperture pixel region, and a second light-shielded pixel region provided on a second side of the aperture pixel region and corresponding to each row in the aperture pixel region, wherein the second side is different from the first side;
a reading unit configured to read a signal from the pixel regions for each row;
a selection unit configured to select a reading row of the pixel regions;
a correction unit configured to correct for each row a black level of an image signal read from the aperture pixel region using a black level reference signal read from the second light-shielded pixel region of a current read row and a black level reference signal read from the first light-shielded pixel region or the second light-shielded area pixel region of a read row that is before the current read row; and
a control unit configured to control the correction unit to correct the black level of the image signal read from the aperture pixel region using the black level reference signals based on a step amount of a signal level occurring in the signal read from the pixel regions of the non-sequentially read row in a case where a read row of the pixel regions is non-sequentially selected by the selection unit.

2. The imaging apparatus according to claim 1, wherein the control unit calculates the step amount of the signal level based on the black level reference signals.

3. The imaging apparatus according to claim 2, wherein the control unit calculates the step amount using signals from a plurality of frames.

4. The imaging apparatus according to claim 1, further comprising a storage unit configured to store in advance the step amount for each imaging condition and skip position.

5. The imaging apparatus according to claim 1, further comprising a storage unit configured to store in advance a correction amount for each row that includes the step amount.

6. The imaging apparatus according to claim 1, further comprising a setting unit configured to set an imaging sensitivity,
wherein the control unit controls the correction unit to correct the black level of the signal read from the aperture pixel region using the black level reference signals based on the step amount in a case where the imaging sensitivity is higher than a predetermined imaging sensitivity.

7. An imaging apparatus comprising:
pixel regions which include an aperture pixel region and a light-shielded pixel region;
a reading unit configured to read a signal from the pixel regions for each row;
a selection unit configured to select a reading row of the pixel regions;
a correction unit configured to correct for each row an image signal read from the aperture pixel region using a reference signal read from the light-shielded pixel region; and
a control unit configured to control the correction unit to correct the image signal read from the aperture pixel region using the reference signal based on a step amount of a signal level occurring in the signal read from the pixel regions of a non-sequentially read row in a case where a read row of the pixel regions is non-sequentially selected by the selection unit.

8. The imaging apparatus according to claim 7, wherein the control unit calculates the step amount of the signal level based on the reference signal.

9. The imaging apparatus according to claim 8, wherein the control unit calculates the step amount using signals from a plurality of frames.

10. The imaging apparatus according to claim 7, further comprising a storage unit configured to store in advance the step amount for a skip position.

11. The imaging apparatus according to claim 7, further comprising a storage unit configured to store in advance the step amount for each imaging condition and skip position.

12. The imaging apparatus according to claim 7, further comprising a storage unit configured to store in advance a correction amount for each row that includes the step amount.

13. The imaging apparatus according to claim 7, further comprising a setting unit configured to set an imaging sensitivity,
wherein the control unit controls the correction unit to correct the signal read from the aperture pixel region using the reference signal based on the step amount in a case where the imaging sensitivity is higher than a predetermined imaging sensitivity.

14. The imaging apparatus according to claim 7, wherein the correction unit corrects a black level of the image signal based on the reference signal.

15. The imaging apparatus according to claim 7, wherein the control unit controls the reading unit to read out the signal from arbitrary rows of the pixel regions.

16. The imaging apparatus according to claim 15, wherein the control unit controls the reading unit to read out the signal from the arbitrary rows of the pixel regions in accordance with an aspect ratio of the image.

17. An imaging apparatus comprising:
pixel regions which include an effective pixel region and a reference pixel region;
a reading unit configured to read a signal from the pixel regions for each row;
a selection unit configured to select a reading row of the pixel regions;
a correction unit configured to correct for each row the image signal read from the effective pixel region using a reference signal read from the reference pixel region; and
a control unit configured to control the correction unit to correct an image signal read from the effective pixel region using the reference signal based on a step amount of a signal level occurring in the signal read from the pixel regions of a non-sequentially read row in a case where a read row of the pixel regions is non-sequentially selected by the selection unit.

18. The imaging apparatus according to claim 17, wherein the control unit calculates the step amount of the signal level based on the reference signal.

19. The imaging apparatus according to claim 18, wherein the control unit calculates the step amount using signals from a plurality of frames.

20. The imaging apparatus according to claim 17, further comprising a storage unit configured to store in advance the step amount for a skip position.

21. The imaging apparatus according to claim 17, further comprising a storage unit configured to store in advance the step amount for each imaging condition and skip position.

22. The imaging apparatus according to claim 17, further comprising a storage unit configured to store in advance a correction amount for each row that includes the step amount.

23. The imaging apparatus according to claim 17, further comprising a setting unit configured to set an imaging sensitivity,
   wherein the control unit controls the correction unit to correct the image signal read from the effective pixel region using the reference signal based on the step amount in a case where the imaging sensitivity is higher than a predetermined imaging sensitivity.

24. The imaging apparatus according to claim 17, wherein the correction unit corrects a black level of the image signal based on the reference signal.

25. The imaging apparatus according to claim 17, wherein the control unit controls the reading unit to read out the signal from arbitrary rows of the pixel regions.

26. The imaging apparatus according to claim 25, wherein the control unit controls the reading unit to read out the signal from the arbitrary rows of the pixel regions in accordance with an aspect ratio of the image.

27. An imaging apparatus comprising:
   pixel regions which include an effective pixel region and a reference pixel region;
   a reading unit configured to read a signal from the pixel regions for each row;
   a correction unit configured to correct for each row an image signal read from the effective pixel region using a reference signal read from the reference pixel region; and
   a control unit configured to control the correction unit to correct the image signal using the reference signal based on a step amount of a signal level occurring in the signal read from the pixel regions in a case where the reading unit does not read out the signal from some rows of the pixel regions.

28. The imaging apparatus according to claim 27, wherein the correction unit corrects a black level of the image signal based on the reference signal.

29. The imaging apparatus according to claim 27, wherein the control unit controls the reading unit to read out the signal from arbitrary rows of the pixel regions.

30. The imaging apparatus according to claim 29, wherein the control unit controls the reading unit to read out the signal from the arbitrary rows of the pixel regions in accordance with an aspect ratio of the image.

* * * * *